May 13, 1969

JAMES E. WEBB
ADMINISTRATOR OF THE NATIONAL AERONAUTICS
AND SPACE ADMINISTRATION
MICROPACKED COLUMN FOR A CHROMATOGRAPHIC SYSTEM
Filed Sept. 9, 1966

3,443,416

INVENTOR.
WILLIAM F. WILHITE
ATTORNEYS

United States Patent Office 3,443,416
Patented May 13, 1969

3,443,416
MICROPACKED COLUMN FOR A
CHROMATOGRAPHIC SYSTEM
James E. Webb, Administrator of the National Aeronautics and Space Administration with respect to an invention of William F. Wilhite, Tujunga, Calif.
Filed Sept. 9, 1966, Ser. No. 578,926
Int. Cl. G01n 31/08
U.S. Cl. 73—23.1                        6 Claims

ABSTRACT OF THE DISCLOSURE

A micropacked column for a chromatographic system is provided with the column's internal diameter in the range of 0.25 mm., being packed with highly uniform particles, varying in ranges from 10 to 80 microns. Within any given column, the difference in size between particles is within 4 microns.

---

Figure 1:
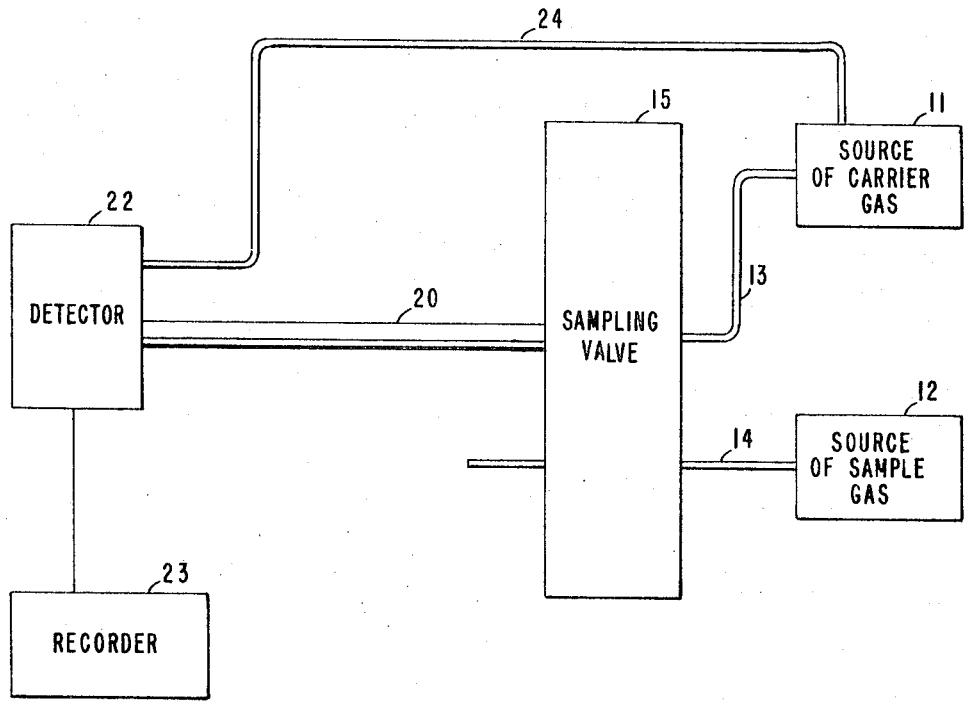

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to gas chromatography and more particularly to a gas chromatographic system incorporating a micropacked column.

A gas chromatographic system may be described as a system for determining the constituents of a sample gas supplied thereto. Briefly, such a system includes a columnar structure, which is either packed with material, hereafter referred to as packing material having known adsorption characteristics and/or is coated with a high molecular weight liquid, with known properties. A carrier gas, supplied at a controlled flow rate, carries the sample gas into the columnar structure wherein, due to the packing material or liquid, the sample gas is separated into its constituents. The carrier gas with the separated gas constituents continuously flows from the columnar structure, hereafter simply referred to as a column, to a detector, which provides output signals as a function of the gas flowing therethrough. The times at which the signals occur with respect to a reference time represent the retention times of the gas constituents. The gas constituents of the sample gas are identified by relating their retention times to the retention times of known gases. For explanatory purposes however, the signals may be thought of as being comparable to the signals provided by known gases so as to identify the gas constituents of the sample gas.

Prior art chromatographic columns may be divided into several classes. These include packed columns comprising tubes of an inner diameter of several millimeters or more and of varying lengths, generally several feet to as many as a few hundred feet. Other types of columns include a capillary or open-end column, internally coated with a liquid, while a packed capillary generally refers to a glass column which, after being packed with packing material, is drawn out to reduce the inner diameter of the column while at the same time greatly increasing the column's overall length.

Herebefore, irrespective of the type of column used, rapid analysis of the sample gas constituents has only been accomplished with relatively high flow rates of the carrier gas, dictating the need of relatively large carrier gas sources. Though such a need is not always significant, such as for example in a stationary system, permanently housed in a laboratory, the need of high carrier gas flow rates presents a definite limitation on the portability of the system or any any other application where the weight and size of the system are of major significance. For example, in space exploration applications, the need of large sources of carrier gas to provide high flow rate of the gas for rapid analysis is most disadvantageous, since one of the major design goals of a system for such application is minimum weight and size.

Accordingly, it is an object of the present invention to provide a new improved gas chromatographic system.

Another object is to provide an improved gas chromatographic system capable of rapid analysis with lower flow rates of carrier gas than prior art systems.

A further object is to provide a novel columnar structure intended to be used in a gas chromatographic system to minimize the required flow rate of a carrier gas needed for the determination of the constituents of a gas sample.

Still a further object is the provision of a novel columnar structure for use in a gas chromatographic system to minimize the overall weight of the system, as compared with the weight of prior art systems having comparable analysis rate capabilities.

These and other objects are achieved by providing a column comprising a metal tube of selected length in the range of centimeters with an internal diameter in the range of 0.25 millimeter (mm.). The tube or column is packed with packing material of highly uniform particle size ($\pm 2$ microns) within the particle size range of 10 to 80 microns ($\mu$). That is, from column to column, the size of the particles may vary from 10 to 80 microns.

However, within any given column, the difference in size between particles is within 4 ($\pm 2$) microns. Thus, the particles in any column are highly uniform. To enclose the packing material within the column, yet enable the carrier and sample gases to flow through the column, the invention further includes porous end plugs which are wedged into the column end. The plugs are machined out of a sintered material which has openings or pores of diameters in the range of 10 ($\pm 5$) microns through which the gases flow in and out of the column.

Contrary to expected performance, the short packed column of the present invention with the extremely smaller inner diameter, hereafter also referred to as a micropacked column, performs most efficiently. It separates the constituents of a sample gas at rates comparable to those attained by prior art systems, but with a flow rate of a carrier gas which is only 0.05%–0.5% of the flow rates needed in such prior art systems. Prior art systems, requiring the high flow rates of the carrier gas, generally employ columns many times larger and with substantially larger inner diameters than those characteristics of the micropacked column of the present invention. The high separation efficiency of the micropacked column is attained with different packing material whose absorption and/or adsorption characteristics may be utilized to separate different gas constituents.

Figure 2:
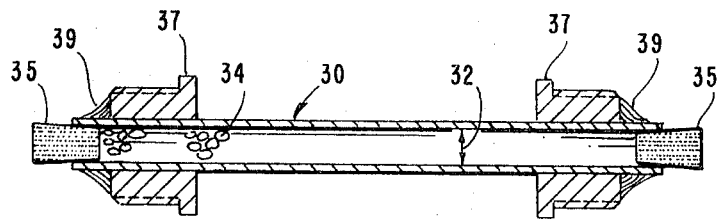

The novel features that are considered characteristic of this invention are set forth with particularity in the appended claims. The invention will best be understood from the following description when read in connection with the accompanying drawings, in which:

FIGURE 1 is a block diagram useful in explaining the operation of a chromatographic system; and FIGURE 2 is an enlarged view of the micropacked column of the present invention.

Attention is now directed to FIGURE 1 which is useful in explaining the operation of a gas chromatographic system. Therein, a source of carrier gas 11 and a source of sample gas 12 are shown coupled by means of gas conduits 13 and 14 respectively, to a sampling valve 15. The carrier gas supplied at a predetermined flow rate passes through the valve 15 into the chromatographic column 20. The function of valve 15 is to inject a selected quantity of sample gas into the flow of the carrier gas at selected intervals.

As the sample gas is forced into the column 20, the packing material or the liquid therein separates the sample gas into its constituents. The carrier gas with the separated constituents of the sample gas flows out of the column into a detector 22. The detector may also be supplied with carrier gas from source 11 by means of a gas conduit 24, to be used as a reference. As is appreciated by those familiar with the art, the function of the detector 22 is to provide output signals related to the gas constituents supplied therethrough from column 20. The signals are recorded by a recorder 23. By comparing the recorded signals with signals produced by known gases, the constituents of the sample gas may be identified.

As herebefore indicated in prior art systems, rapid analysis could only be accomplished with relatively high flow rates of the carrier gas from source 11. Also the column 20 is generally quite long. Some flow rates quoted in the literature as used in actual systems are between 250 milliliters per minute (ml./min.) to 700 ml./min. and more, while column lengths of 6 feet to 1000 feet are mentioned. The length of the column generally increases as the inner diameter of the column decreases.

However, in accordance with the teachings of the present invention, a chromatographic system is provided which is capable of rapid analysis with very low flow rates and with a column which is extremely short, as compared to prior art columns, and having an extremely small inner diameter.

In developing a chromatographic system capable of rapid analysis with extremely low flow rates, in order to reduce the required size and weight of the carrier gas source, unexpected results were achieved when packing a column with an inner diameter of less than 0.5 mm. and of a length in the range of 1 inch with packing material of particle sizes which are less than $100\mu$.

In one actual reduction to practice, a column 30 diagrammed in FIGURE 2, to which reference is made herein, was constructed of stainless steel tubing with an inner diameter 32 of 0.25 mm. The length of the column was in the range of 1 inch. The small tubing diameter limited the usable particle size of packing material 34 to a range of less than $100\mu$. Due to the small dimensions of the column and the packing material particle size, the column may be thought of as a micropacked column.

Packing of the microcolumn is accomplished by following the normal column packing operation. However, because of the extremely small diameter of the column, the packing operation is performed under a stereomicroscope. In order to hold the fine grain packing material in the micropacked column, novel column plugs 35 are provided. Each plug which must be porous to enable gas to flow into and out of the column, as well as withstand a column actuation of several hundred degrees centigrade is shaped to have an outer diameter equal to the inner diameter of the column about at least a portion of its exterior surface, so that a part thereof may be wedged into place at the end of the column tubing. In one actual reduction to practice, the plugs were electronically machined from 400-series magnetic sintered stainless steel with pore sizes in the range of $10\mu$. Thus, the plugs provide clear passage for gas to flow in and out of the micropacked column, while encasing the packing material therein. A pair of fittings 37 are connected to the column ends by means of fitting ferrules 39. These fittings, which are preferably gas chromatography low dead volume fittings, are used to connect the column to the sampling valve 15 (FIGURE 1) and the detector 22.

The micropacked column has been found to be most efficient, rapidly separating constituents of a sample gas with very low flow rates of the carrier gas. The particular packing material used depends on the expected constituents of the sample gas and the length of the column may vary slightly depending on the desired speed of separation and the expected carrier gas flow rate.

A micropacked column 2.5 cm. long, 0.25 mm. inner diameter packed with 1% diglycerol on 25–28$\mu$ silica gel separated $CO_2$ from Ar and $N_2$ in less than two seconds with a flow rate of 0.5 cm.$^3$ (cc.) per minute of helium, acting as the carrier gas. The sampling valve used, injected 1 microliter ($\mu$l.) of sample gas into the carrier gas stream. A micropacked column with an identical inner diameter, i.e. 0.25 mm. but 3.2 cm. long packed with molecular sieve 5A material of a particle size 25–28$\mu$, was used to separate argon from nitrogen with the same flow rate of helium within two seconds.

It has been found that due to the small volume of gas flowing out of the micropacked column, the constituents of the sample gas may best be detected by thermal conductivity method of detection, because of the relative simplicity with which a hot-wire filament detector of small internal volume could be built. The aforementioned separation results have been achieved with a detector of an internal volume of 0.1 $\mu$l. A filament comprised of a wire of 10% rodium-platinum, 0.3 mm. long and 0.5$\mu$ in diameter. It was secured in the internal volume of the detector through which the gas flows by soft soldering it between two platinum wires 0.130 mm. in diameter.

Although specific structure of a thermal conductivity detector has been described, it should be appreciated that other type detectors of suitable small internal volume may be used with the micropacked column of the invention which produces unexpected results in providing rapid separation of constituents of a sample gas with flow rates of a carrier gas which are several order of magnitude below the flow rates required by prior art systems.

The exact dimensions of the micropacked column, as well as the particular packing material used, depend on the available flow rate of the carrier gas and the expected constituents of the sample gas. However the micropacked column can generally be defined as a column with an inner diameter of less than 0.5 mm. and a length in the range of 1 inch, packed with material of a particle size related to its inner diameter. When using a column of 0.25 mm., the preferred particle size is between 10$\mu$ to 80$\mu$. Within any particle size, the particles should be uniform to within $\pm 2\mu$. The microcolumn also includes end plugs with pore sizes in the range of 10$\mu$, secured at the ends of the column to encase the packing material therein, yet enable gas to flow into and out of the column.

There has accordingly been shown and described herein a novel micropacked column for use in a chromatographic system. It is appreciated that those familiar with the art may make modifications in the specific arrangements without departing from the spirit of the invention, the scope of which is defined in the appended claims.

What is claimed is:

1. In a gas chromatographic system of the type including a first source of a carrier gas, providing said carrier gas at a predetermined flow rate, a second source of gas to be analyzed by said system, valve means for interposing gas to be analyzed in the flow of said carrier gas, a detecting means for analyzing gas flowing therethrough as a function of predetermined expected responses of known gasses, and channel means connected between said valve means and said detecting means for providing a flow channel for the carrier gas and the sample gas interposed therein from said valve means to said detecting means, the improvement comprising:

channel means comprising a tubular member of a preselected length having first and second ends and an opening extending therebetween along its longitudinal axis of a diameter in the range of less than 1 millimeter;

packing particles of matter having selected absorbing characteristics packed in said tubular member, the sizes of said particles being uniform in the range of 10 to 80 microns, with the difference in sizes between individual particles being uniform within 4 microns; and end plugs secured at said first and second ends for enclosing said packing particles within said tubular member, each of said plugs defining a plurality of openings large enough for said carrier gas and sample gas to flow through the opening of said tubular member.

2. In a gas chromatographic system for determining the constituents of a gas sample, the system including a carrier gas, supplied from a source at a selected flow rate, valve means for combining the gas sample in the flow of said carrier gas, a gas sensitive detector providing signals indicative of the gas flowing therethrough, and a channel connected to said valve means and said detector for providing a gas flow path for the carrier gas from said valve means to flow to said detector and for separating the constituents of the sample gas into predetermined groupings as said sample gas flows from said valve means to said detector, an improved channel for reducing the flow rate of said carrier gas the amount of sample gas and the time required to provide signals indicative of the sample gas constituents, the improved channels comprising:

a tubular member of a length in the range of about one inch defining an opening along its longitudinal axis of a diameter in the range of 0.25 millimeters;

particles of matters of predetermined absorptive characteristics in relation to the expected constituents of the sample gas, packed in the opening of said tubular member, the sizes of said particles ranging between about 10 to 80 microns, and varying from one another in a range of less than 4 microns; and porous end means for encapsulating said particles in said tubular member, said end means defining a plurality of openings large enough for the carrier gas and the constituents of the sample gas to flow through said tubular member.

3. The improved system defined in claim 2 wherein said porous end means comprises first and second plugs insertable in opposite ends of said tubular member, each plug defining openings in the range of 10 microns.

4. The improved system defined in claim 3 wherein each plug is cone-shaped of magnetic sintered stainless steel wedgedly insertable through an end of said tubular member into the opening thereof.

5. The improved system defined in claim 2 wherein the sizes of the particles are in the range of less than 30 microns with the difference in sizes of the particles in the column being within 4 microns.

6. The improved system as recited in claim 2 wherein the sizes of the particles are in the range of about 25 to 28 microns and the difference in the sizes of the particles being within about 3 microns.

References Cited

UNITED STATES PATENTS

| 3,250,395 | 5/1966 | Blume | 210—263 |
| 3,283,483 | 11/1966 | Halasz et al. | 55—386 |
| 3,295,296 | 1/1967 | Halasz et al. | 55—67 |

OTHER REFERENCES

Boeke et al.: "High Speed Vapor Flow Chromatography," Gas Chromatography, 3rd ed., Int. Sym. Instr. Soc. Am., pub. 1962 by Academic Press, pp. 394, 400 and 401.

Carter: "Micro-Packed Columns for GC" Nature, vol. 197, pp. 684–5, February 1963.

RICHARD C. QUEISSER, *Primary Examiner.*

V. J. TOTH, *Assistant Examiner.*

U.S. Cl. X.R.

55—386